(12) United States Patent
Glaze et al.

(10) Patent No.: US 6,320,974 B1
(45) Date of Patent: *Nov. 20, 2001

(54) STAND-ALONE BIOMETRIC IDENTIFICATION SYSTEM

(75) Inventors: Mary L. Glaze, Fairfax Station, VA (US); Joseph M. Braceland, Washington, DC (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,957

(22) Filed: Sep. 25, 1997

(51) Int. Cl.$^7$ ........................................ G06K 9/00
(52) U.S. Cl. .................. 382/115; 382/118; 382/119; 382/313; 340/825.34; 361/680; 361/682; 361/683; 361/727
(58) Field of Search ................... 382/115, 116, 382/117, 118, 119, 127, 313; 340/825.34, 825.31; 361/680, 681, 683, 682, 727

(56) References Cited

U.S. PATENT DOCUMENTS

| | | | |
|---|---|---|---|
| 4,554,591 | * 11/1985 | Kee ........................................ | 358/467 |
| 4,805,223 | 2/1989 | Denyer ..................................... | 382/4 |
| 4,843,377 | 6/1989 | Fuller et al. ........................... | 340/573 |
| 4,993,068 | 2/1991 | Piosenka et al. ...................... | 380/23 |
| 5,067,162 | * 11/1991 | Driscoll, Jr. et al. ................. | 382/4 |

(List continued on next page.)

FOREIGN PATENT DOCUMENTS

| | | | |
|---|---|---|---|
| 07050245 | 12/1996 | (EP) | G06F/1/16 |
| 0797170 | 9/1997 | (EP) | G06T/7/00 |
| WO97/04375 | 2/1997 | (WO) | G06F/1/00 |
| WO9618169 | 6/1996 | (WO) | G06K/9/00 |

OTHER PUBLICATIONS

Lindqvist, frank H. et al., "Combination radiofrequency inentification card–fingerprint identification system". p. 1–60, Nov. 8, 1996.*

Lindqvist, frank H. et al., "Combination radiofrequency identification card— fingerprint inentification system" p. 1–60, Nov. 8, 1996.*

Henry c. Lee, Ph.D. "Advances in fingerprint Technology" pp. 212–226, 1994.*

International Search Report, Feb. 26, 1999.

*Primary Examiner*—Matthew C. Bella
*Assistant Examiner*—Sheela Chawan
(74) *Attorney, Agent, or Firm*—Baker Botts L.L.P.

(57) ABSTRACT

A distributed biometric identification system incorporates stand-alone workstations. The system generally includes a plurality of stand-alone workstations capable of communicating with a central server remotely located from the workstations. The workstations receive input biometric data, such as fingerprint and photographic data, and compares that data to biometric data stored in the workstation. The workstation compares the input biometric data with stored biometric data to determine whether any of the stored biometric data matches the input biometric data. The results of the comparison are provided to the workstation screen. Workstation mobility is improved by housing the workstation in a self-contained, compartmentalized carrying case. Workstation mobility may be even further enhanced by housing the workstation in a so-called lunchbox configuration having a main body, a front panel hinged to the main body, and a back panel hinged to the main body. The front and back panels each have a stowed position adjacent the main body, and a deployed position away from the main body. When the panels are in their stowed positions, the workstation (i.e., main body, front panel, and back panel) is a compact, portable unit.

5 Claims, 5 Drawing Sheets

U.S. PATENT DOCUMENTS

| | | | |
|---|---|---|---|
| 5,214,574 | * 5/1993 | Chang | 361/393 |
| 5,245,329 | 9/1993 | Gokcebay | 340/825.31 |
| 5,291,560 | 3/1994 | Daugman | 382/2 |
| 5,337,043 | 8/1994 | Gokcebay | 340/825.31 |
| 5,359,669 | 10/1994 | Shanley et al. | 382/6 |
| 5,386,104 | 1/1995 | Sime | 235/379 |
| 5,420,936 | 5/1995 | Fitzpatrick et al. | 382/124 |
| 5,457,747 | 10/1995 | Drexler et al. | 380/24 |
| 5,467,403 | * 11/1995 | Fishbine et al. | 382/116 |
| 5,485,312 | 1/1996 | Horner et al. | 359/561 |
| 5,513,272 | 4/1996 | Bogosian, Jr. | 382/116 |
| 5,546,943 | * 8/1996 | Gould | 600/425 |
| 5,566,327 | 10/1996 | Sehr | 395/600 |
| 5,608,387 | * 3/1997 | Davies | 340/825.34 |
| 5,613,012 | 3/1997 | Hoffman et al. | 382/115 |
| 5,615,277 | * 3/1997 | Hoffman | 382/115 |
| 5,633,782 | * 5/1997 | Goodman et al. | 361/683 |
| 5,648,648 | 7/1997 | Chou et al. | 235/382 |
| 5,664,207 | 9/1997 | Crumpler et al. | 395/766 |
| 5,764,789 | 6/1998 | Pare, Jr. et al. | 382/115 |
| 5,801,681 | * 9/1998 | Sayag | 345/156 |
| 5,815,252 | 9/1998 | Price-Francis | 356/71 |
| 5,822,181 | * 10/1998 | Jung | 361/683 |
| 5,828,773 | * 10/1998 | Setlak et al. | 382/124 |
| 6,016,476 | * 1/2000 | Maes et al. | 705/1 |
| 6,018,739 | * 1/2000 | McCoy et al. | 707/102 |

* cited by examiner

STAND-ALONE BIOMETRIC IDENTIFICATION SYSTEM

BACKGROUND OF THE INVENTION (a) Field of the Invention

The present invention relates generally to identification systems. More particularly, it relates to a method and apparatus for identifying individuals based on biometric information such as fingerprints and photographs.

(b) Description of Related Art

In the past, identification of individuals that are processed by the Immigration and Naturalization Service (INS) or other governmental agencies, for example, has been a relatively slow process. Although many governmental agencies maintain large databases containing fingerprints, photographic information and other relevant data pertaining to individuals that use the services of the respective agencies, no known system has been able to quickly search and retrieve information relating to identification and interaction with these individuals. For example, the INS interacts with and is required to identify millions of persons each year, including immigration law violators, immigration benefit applicants, individuals requesting asylum, travelers, and visitors to the United States. Many encounters are processed under severe time constraints and with insufficient access to relevant information.

A co-pending, commonly owned patent application, Ser. No. 08/857,112 filed on May 15, 1997 U.S. Pat. No. 6,018,739 addresses this problem by providing a distributed biometric identification system and architecture for rapidly identifying individuals using fingerprint and photographic data. The disclosed architecture includes a centralized server, a plurality of distributed client workstations that are remotely located from the centralized server, and a wide area telecommunications network interconnecting the client workstations to the server. The centralized server includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals.

Still another co-pending, commonly owned patent application, Ser. No. 08/937,956 filed on Sep. 15, 1997 is directed to an improvement over the above-described distributed biometric system wherein user location options, user mobility, and overall user access to the system is even further enhanced by providing highly mobile user workstations. More particularly, the invention disclosed in Ser. No. 08/987,956 may be embodied in a distributed, mobile biometric identification system and architecture for rapidly identifying individuals using fingerprint and photographic data. The disclosed architecture includes a centralized server, a plurality of distributed, mobile client workstations that are remotely located from the centralized server, and a two-way modem connection for providing a communications medium between the client workstations and the server.

The above-described mobile workstation is preferably embodied in a substantially portable computing environment having, for example, a portable computer, a portable camera coupled to the computer, a portable fingerprint scanner coupled to the computer, and a substantially portable communications link coupled to the computer. Preferably, the communications link includes a land-based or satellite-based mobile radiotelephone.

The above-described distributed biometric systems are highly effective in allowing a large number of remotely located users to access, search, compare and retrieve various types of biometric identifying data/information. The present invention is directed to an improvement wherein user location options, user mobility, and overall user access to the distributed biometric system is even further enhanced.

SUMMARY OF THE INVENTION

The present invention may be embodied in a distributed biometric identification system having a plurality of stand-alone user workstations. More particularly, the invention may be embodied in a distributed biometric identification system and architecture for rapidly identifying individuals using fingerprint and photographic data. The disclosed architecture includes a plurality of substantially stand-alone work stations. The workstations communicate with one another, via a centralized server, in a variety of ways, including modem and/or a wide-area or local-area telecommunications network. Each work station includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals. The modem or WAN/LAN telecommunications network allows the stand-alone workstations to communicate with the centralized INS server in order to provide information about each workstations activities. The information from each workstation is gathered at a centralized INS server and re-distributed to all stand-alone workstations as a update to each workstation's files.

The above-described stand-alone workstation is preferably embodied in a computer-based environment having, for example, a conventional personal computer, a camera coupled to the computer, a fingerprint scanner coupled to the computer, and a communications link coupled to the computer. Preferably, the communications link includes a modem communicating through a land-based radiotelephone, a satellite-based mobile radiotelephone, the PSTN, a WAN/LAN connection, or other medium.

In one embodiment of the present invention, the above-described personal computer has, for example, 32 MB of RAM, an AC power supply, an AC cable, an MRT video cable, a modem/phone cable, an ethernet cable, MRT VideoPort PC card, and a Megahertz 33.6 modem/ethernet. The personal computer may be configured with Windows 95 operating system software, for example. The personal computer may be further configured with a user-friendly and intuitive graphical user interface using, for example, Microsoft Visual C++ software, and a Structured Query Language (SQL) based, client-server, front end query tool. The personal displays menu-driven screens from which users may select specific functions (such as search and enroll, search only, and verify functions) that are to be performed by the computer.

In another embodiment of the present invention, the personal computer is replaced with a so-called "notebook" or "laptop" computer having, for example, 32 MB of RAM, an AC power supply, an AC cable, an MRT video cable, a modem/phone cable, an ethernet cable, MRT VideoPort PC card, and a Megahertz 33.6 modem/ethernet. The laptop computer may be configured with Windows 95 operating system software, for example. The laptop computer may be further configured with a user-friendly and intuitive graphical user interface using, for example, Microsoft Visual C++, and a Structured Query Language (SQL) based, client-server, front end query tool. The laptop displays menu-driven screens from which users may select specific functions (such as search and enroll, search only, and verify functions) that are to be performed by the system.

In another embodiment of the present invention, the laptop computer, camera, fingerprint scanner and modem/radiotelephone are electronically coupled together and conveniently housed in a carrying case. For example, a two-piece, hinged rugged construction carrying case may be outfitted with a foam template having cutouts for holding in place the various components, a power strip for accepting the power cord connections of the various components and providing 12 volt AC power thereto, and a 12 volt DC invertor having a 12 volt extension cord for coupling the strip to an alternative power source, for example, a cigarette lighter of an automobile. The power strip preferably includes surge suppressor circuitry to protect the various components from damage due to power surges.

In still another embodiment of the invention, the above-described computers may be housed in a portable, substantially rectangular, self-contained unit known generally as a "lunchbox" CPU. The lunchbox, according to the present invention, includes a main body, a front panel and a back panel. The front and back panels are hinged to the main body such that each may be folded up to a stowed position against the main body, or folded down to a deployed position away from the main body. In general, the main body houses the main computing boards and a display screen, the front panel houses a keyboard, and the back panel houses the camera, the fingerprint scanner and the modem/radiotelephone. When in their stored positions, the front and back panels and the main body combine to form the portable lunchbox. When the front panel is deployed, it exposes the keyboard and the display screen on the main body. When the back panel is deployed, it exposes the camera, fingerprint scanner and radiotelephone.

The following describes the procedures that can be followed when using the above-described system in connection with immigration services. When an individual is identified as an undocumented alien, he/she is taken to a stand-alone workstation. The workstation operator chooses the "search and enroll" feature. The initiation of "search and enroll" brings up a screen that prompts the operator to first place the alien's left index finger on the fingerprint scanner. The screen then prompts the operator to place the right index finger on the fingerprint scanner. Quality analysis is performed on the scanned fingerprint data to make sure that the fingerprint image is of sufficient quality. The computer then turns on the camera and prompts the user to snap a photograph of the individual.

After the picture is taken, the user is returned to the entry screen for entry of non-biometric data (referred to herein as "biodata"). The user then enters the alien's name, birthdate, age and any other information that can be obtained. The workstation computer associates all "biodata" with the current biometric data and with the current request. Upon completion of the biodata screen, a submit button is pressed. The submit button initiates the sending of data to the databases stored in the computer of the workstation. A key feature of the invention is that the data needed to perform the searches is provided at all of the workstations, and updated periodically over a widely available communications link such as the public switched telephone network (PSTN), land-based radiotelephone infrastructure, satellite-based communications, or a WAN/LAN network.

The workstation's computer begins processing the input data, freeing the workstation to begin enrolling another individual. A status indicator on the bottom of the workstation screen indicates the status of a particular transaction. The workstation computer searches a number of databases, each of which has its own meaning. The databases are referred to generally as "lookout", "recidivists", "asylum", and "benefits". The lookout database contains information on individuals with criminal records on file with the Immigration and Naturalization Services, or who are considered to be "lookouts" posing potential threats to the health and safety of border patrol personnel. The recidivists database contains information on individuals who have attempted to enter the U.S. illegally on multiple occasions. The asylum database contains individuals encountered during an asylum application process. The asylum information is checked to detect and reduce immigration fraud. The benefit database is used to verify the identity of individuals encountered during the benefit servicing process to approve or deny applications or petitions for immigration benefits.

The workstation computer reports the number of hits, if any. The workstation may then call up the biometric data and/or the biodata for each hit in order to review it and make a determination of whether the "hit" is the individual in question.

The present invention may be embodied in a stand-alone workstation for use in connection with a distributed biometric identification system, said workstation comprising: a portable computer having databases containing stored biometric data; a biometric data input system coupled to said portable computer; a portable communications terminal coupled to said portable computer; said biometric data input system capable of receiving input biometric information and providing said input biometric information to said computer; said computer programmed to compare said input biometric data to said stored biometric data in said databases; and said computer further programmed to transmit over said communications terminal input biometric data that should be stored in said databases as an update to that database; said computer further programmed to receive over said communications terminal and store in said database update biometric information from other stand-alone workstations.

In an alternative embodiment of the above described workstation, said input biometric data comprises input fingerprint data; said stored biometric data comprises stored fingerprint data; and said computer determines whether stored fingerprint information matches said input fingerprint data.

The present invention may also be embodied in a stand-alone workstation for use in connection with a distributed biometric identification system, said workstation comprising: a portable carrying case containing a portable computer, a biometric data input system coupled to said portable computer, a portable communications terminal coupled to said portable computer, and a power strip for coupling power to said computer, biometric data input system, and communications terminal; said computer having databases containing stored biometric data; said biometric data input system capable of receiving input biometric information and providing said input biometric information to said computer; said computer programmed to compare said input biometric data to stored biometric.

The present invention may also be embodied in a stand-alone workstation for use in connection with a distributed biometric identification system, said workstation comprising: a portable computer having a main body, a front panel hinged to said main body, and a back panel hinged to said main body; said front panel having a stowed position adjacent said main body and a deployed position away from said main body; said back panel having a stowed position adjacent said main body and a deployed position away from said main body; a biometric data input system coupled to said portable computer and at least partially housed in said back panel; a portable communications terminal coupled to said portable computer and at least partially housed in said back panel; said computer including databases storing stored biometric data; said biometric data input system capable of receiving input biometric information and providing said input biometric information to said computer; said computer programmed to compare said input biometric data to said stored biometric data.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
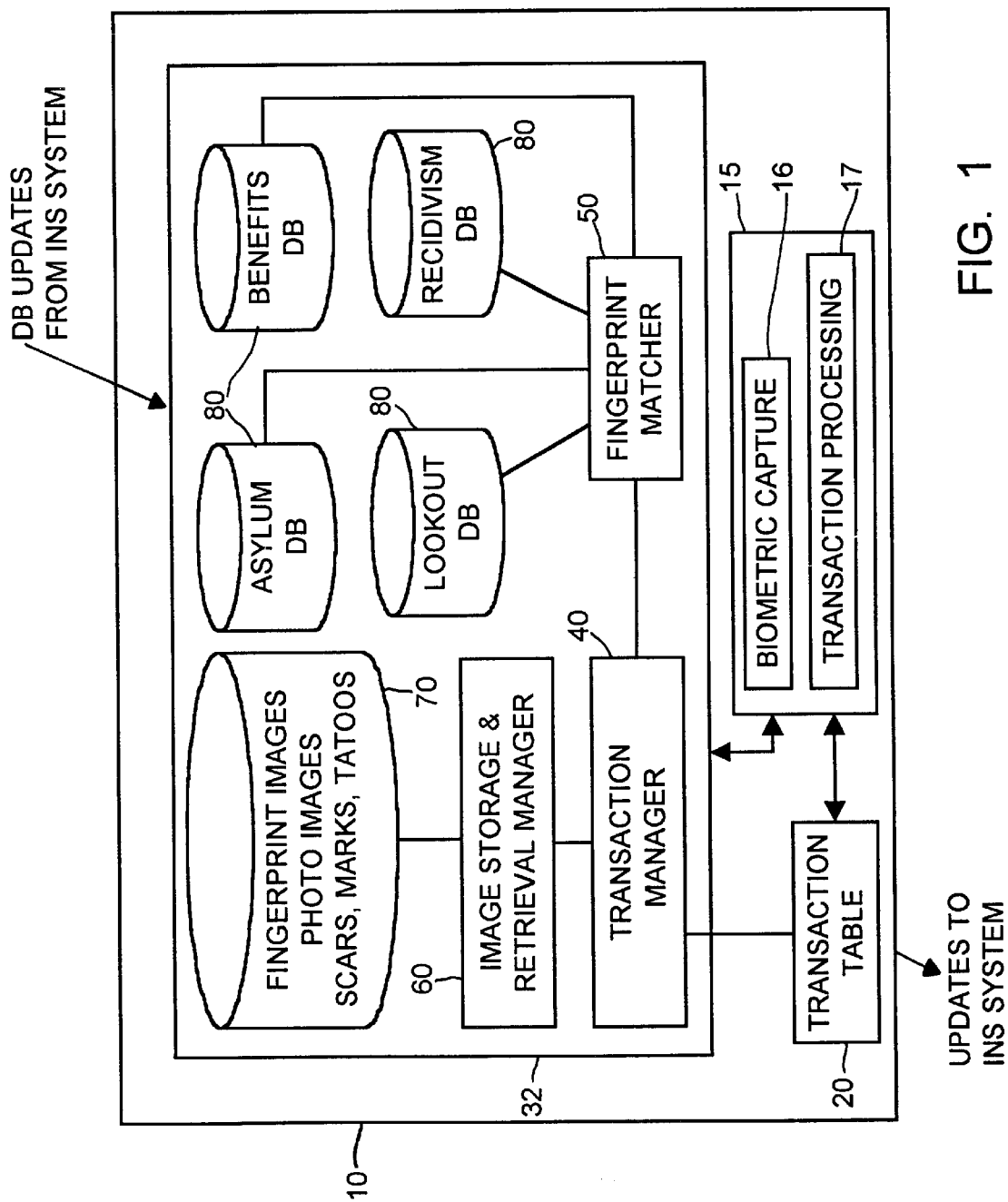
FIG. 1 is a diagram of a stand-alone workstation that is part of a distributed biometric identification system embodying the present invention.

By way of introduction, a general description of the invention and the disclosed embodiments thereof will now be provided. The present invention may be embodied in a distributed biometric identification system having a plurality of stand-alone user workstations. More particularly, the invention may be embodied in a distributed, biometric identification system and architecture for rapidly identifying individuals using fingerprint and photographic data. The disclosed architecture includes a plurality of substantially stand-alone work stations. The workstations communicate with one another, and with a remote centralized INS server, over a variety of communications means, including modem and a LAN/WAN telecommunications network interconnecting the client workstations. Each workstation includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals. The communications link between the workstations and a centralized INS server allows the stand-alone workstations to exchange activity at each workstation in order to update each workstation's files.

The above-described stand-alone workstation is preferably embodied in a substantially portable computing environment having, for example, a portable computer, a portable camera coupled to the computer, a portable fingerprint scanner coupled to the computer, and a substantially portable communications link coupled to the computer. Preferably, the communications link includes a land-based or satellite-based mobile radiotelephone.

In one embodiment of the present invention, the portable computer includes a so-called "notebook" or "laptop" computer having for example 32 MB of RAM, an AC power supply, and an AC power cable. Additionally, the portable computer is outfitted with an MRT VideoPort PC card and a Megahertz 33.6 modem/ethernet card. The MRT VideoPort PC card serves as the interface between the portable computer hardware and the fingerprint scanner and the color camera. An MRT video cable is also provided to connect the MRT VideoPort PC card to the fingerprint scanner and the color camera. The Megahertz 33.6 modem/ethernet card provides the portable computer the ability to network to the INS server from local and remote sites. Specifically, networking from local sites can be accomplished through the ethernet functionality of the card. Remote networking can be accomplished through the use of the 33.6 baud modem functionality of the card. Additionally, the required network and telephone cables are also used in the configuration. The portable computer may be configured with Windows 95 operating system software, for example. The portable computer may be further configured with a user-friendly and intuitive graphical user interface using, for example, Microsoft Visual C++ software, and a structured language (SQL) based, client-server, front end query tool. The SQL software is an off the shelf product from Oracle®. The SQL software is the foundation of the Oracle® level of communication within the system. That is, when the system user enters a query the Oracle® component that accepts the query needs to be able to communicate the query over the network to another Oracle® component. The SQL language performs the operation of enabling the query communication between Oracle® components. The portable computer's screen displays menu-driven screens from which users may select specific functions (such as search and enroll, search only, and verify functions) that are to be performed by the system.

In another embodiment of the present invention, the laptop computer, camera, fingerprint scanner and radiotelephone are electronically coupled together and conveniently housed in a carrying case. For example, a two-piece, hinged rugged construction carrying case may be outfitted with a foam template having cutouts for holding in place the various components, a power strip for accepting the power cord connections of the various components and providing 12 volt AC power thereto, and a 12 volt DC invertor having a 12 volt extension cord for coupling the strip to an alternative power source, for example, a cigarette lighter of an automobile. The power strip preferably includes surge suppressor circuitry to protect the various components from damage due to power surges.

In still another embodiment of the invention, the above-described portable computer may be housed in a portable, substantially rectangular, self-contained unit known generally as a "lunchbox" CPU. The lunchbox, according to the present invention, includes a main body, a front panel and a back panel. The front and back panels are hinged to the main body such that each may be folded up to a stowed position against the main body, or folded down to a deployed position away from the main body. In general, the main body houses the main computing boards and a display screen, the front panel houses a keyboard, and the back panel houses the camera, the fingerprint scanner and the radiotelephone. When in their stowed positions, the front and back panels and the main body combine to form the portable lunchbox. When the front panel is deployed, it exposes the keyboard and the display screen on the main body. When the back panel is deployed, it exposes the camera, fingerprint scanner and radiotelephone.

In still another embodiment of the invention, the workstation may be a personal computer having a camera coupled to the computer, a fingerprint scanner coupled to the computer, and a communications link coupled to the computer. Preferably, the communications link includes a land-based or satellite-based mobile radiotelephone.

In one embodiment of the present invention, the above-described personal computer has, for example, 32 MB of RAM, an AC power supply, and an AC power cable. Additionally, the personal computer is outfitted with an MRT VideoPort PC card and a Megahertz 33.6 modem/ethernet card. The MRT VideoPort PC card serves as the interface between the personal computer hardware and the fingerprint scanner and the color camera. An MRT video cable is also provided to connect the MRT VideoPort PC card to the fingerprint scanner and the color camera. The Megahertz 33.6 modem/ethernet card provides the personal computer the ability to network to the INS server from local and remote sites. Specifically, networking from local sites can be accomplished through the ethernet functionality of the card. Remote networking can be accomplished through the use of the 33.6 baud modem functionality of the card. Additionally, the required network and telephone cables are also used in the configuration. The computer may be configured with Windows 95 operating system software, for example. The computer may be further configured with a user-friendly and intuitive graphical user interface using, for example, Microsoft Visual C++ software, and a structured language (SQL) based, client-server, front end query tool. The SQL software is an off-the-shelf product from Oracle®. The SQL software is the foundation of the Oracle® level of communication within the system. That is, when the system user enters a query the Oracle® component that accepts the query needs to be able to communicate the query over the network to another Oracle® component. The SQL language performs the operation of enabling the query communication between Oracle® components. The portable computer's screen displays menu-driven screens from which users may select specific functions (such as search and enroll, search only, and verify functions) that are to be performed by the system.

The following describes the procedures that can be followed when using the above-described system in connection with immigration services. When an individual is identified as an undocumented alien, he/she is taken to a mobile workstation. The workstation operator chooses the "search and enroll" feature. The initiation of "search and enroll" brings up a screen that prompts the operator to first place the alien's left index finger on the fingerprint scanner. The screen then prompts the operator to place the right index finger on the fingerprint scanner. Quality analysis is performed on the scanned fingerprint data to make sure that the fingerprint image is of sufficient quality. The screen then turns on the camera and prompts the user to snap a photograph of the individual.

After the picture is taken, the user is returned to the entry screen for entry of non-biometric data (referred to herein as "biodata"). The user then enters the alien's name, birth date, age and any other information that can be obtained. The workstation associates all "biodata" with the current biometric data and with the current request. Upon completion of the biodata screen, a submit button is pressed. The submit button initiates the sending of data to the databases stored in the computer of the workstation. A key feature of the invention is that the data needed to perform the searches is provided at all of the workstations, and updated periodically over a widely available communications link such as the public switched telephone network (PSTN), land-based cellular telephone infrastructure, or satellite-based communications.

The workstation's computer begins processing the input data, freeing the workstation to begin enrolling another individual. A status indicator on the bottom of the workstation screen indicates the status of a particular transaction. The workstation computer searches a number of databases, each of which has its own meaning. The databases are referred to generally as "lookout", "recidivists", "asylum", and "benefits". The lookout database contains information on individuals with criminal records on file with the Immigration and Naturalization Services, or who are considered to be "lookouts" posing potential threats to the health and safety of border patrol personnel. The recidivists database contains information on individuals who have attempted to enter the U.S. illegally on multiple occasions. The asylum database contains individuals encountered during an asylum application process. The asylum information is checked to detect and reduce immigration fraud. The benefits database is used to verify the identity of individuals encountered during the benefit servicing process to approve or deny applications or petitions for immigration benefits.

The workstation computer reports the number of hits, if any. The workstation computer may then call up the biometric data and/or the biodata for each hit in order to review it and make a determination of whether the "hit" is the individual in question.

Referring now to FIG. 1, a diagram of a system employing the present invention is shown. The system generally includes a stand-alone station 10 having a user interface__, a transaction table 20 and a core 30. The core 30 includes a transaction manager 40, a fingerprint manager 50, an image storage an retrieval manager 60, a fingerprint and photograph database 70, and various databases 80. All information regarding previously apprehended individuals is housed in the core 30. The transaction manager 40 performs the function of controlling the functionality of the core 30. The user interface (referred to as "IDENT") provides the user with a graphical interface for interacting with the system. The user interface 15 performs the functions of providing user interface for the capture of biometric data 16 and transaction processing 17. The software functionality of the IDENT interface and information processing will be addressed more thoroughly in conjunction with FIG. 6.

When an individual is apprehended, the fingerprint matcher 50 is used to scan the fingerprints of the individual. The fingerprint scanner then scans the relevant databases 80 for information regarding the individual. The current encounter with the individual is then recorded in the relevant databases 80 as well as fingerprints and photographs of the individual. The transaction table 20 performs the function of recording any information that is added to the local databases 70, 80 of the core 30. Periodically, the transaction table 20 transmits the recorded information to the INS system which includes a centralized INS server. This enables the INS system to always be up to date with the latest information regarding individuals.

Because the INS database at the centralized INS server is the central point for all information and changes to the databases, the local databases 70, 80 of the core 30 in the stand-alone system 10 are updated periodically from the INS system. Periodic updating enables each system user to be apprised of the latest information regarding apprehended individuals. The updates to and from the INS system may be scheduled to occur at regular intervals.

The stand-alone workstation 10 provides fingerprint matching functionality along with database and transaction management functions. Database functions may include but are not limited to the storage and retrieval of biodata such as fingerprints, biographical history, and photographs. The database may also contain information as to whether an individual is dangerous, a repeat immigration offender, or eligible for asylum and benefits. The workstation 10 may also include software modules that allow the system user to begin processing paperwork regarding an apprehended individual before returning to an office to complete processing of the individual. Traditionally, paperwork on apprehended individuals has been typed on a typewriter and photocopied as necessary. The software modules at the workstation, along with the central server 10, allow the system user to enter relevant biodata from the apprehended individual into a database. The biodata may then be accessed and printed as needed by all authorized users of the workstation. Such software modules may include detention facility information, such as the location of a prisoner within the prison system; and immigrant benefits and asylum information.

Figure 2:
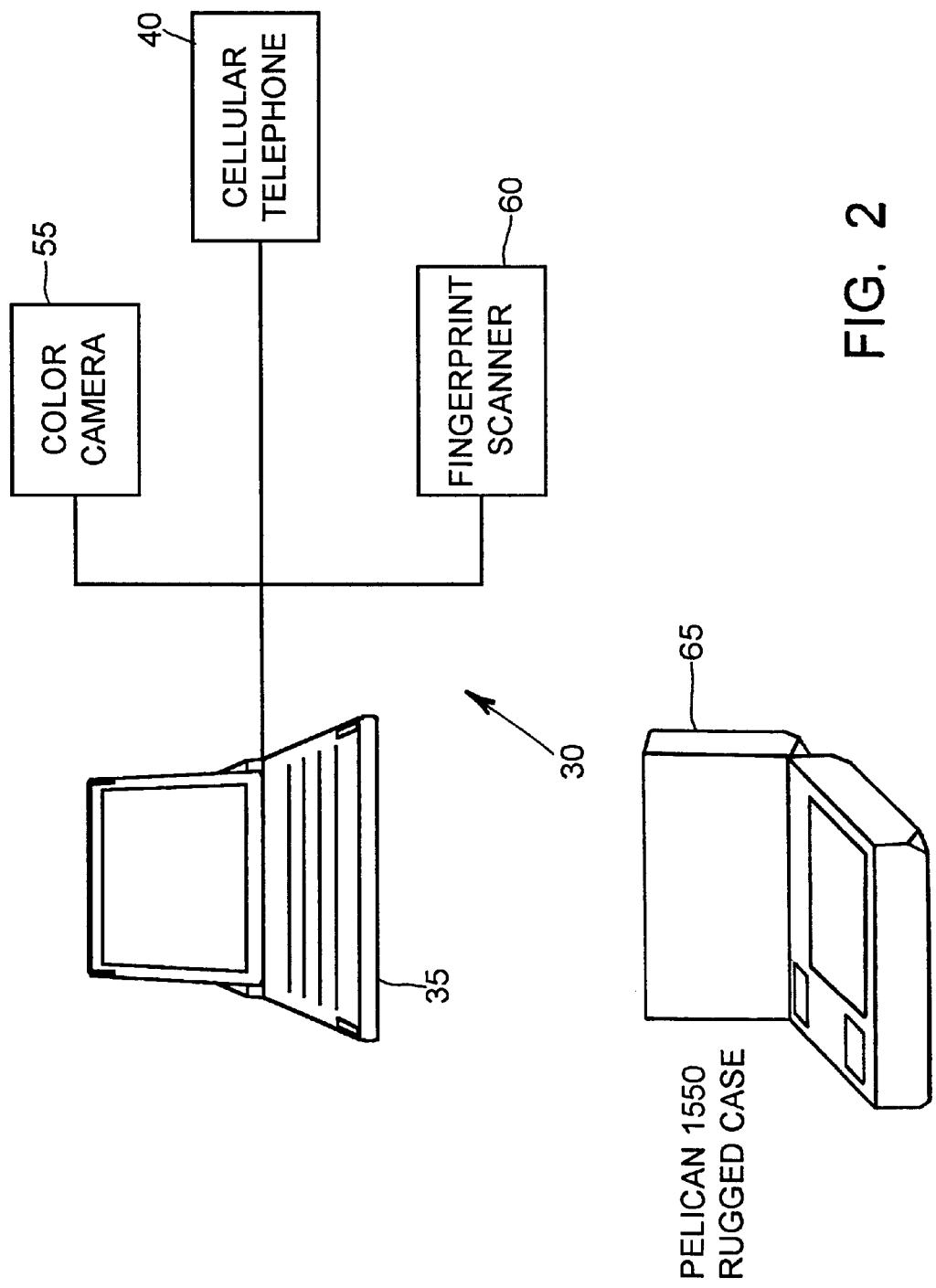
FIG. 2 is an alternative embodiment of the stand-alone workstation shown in FIG. 1, including a notebook/laptop computer and a portable case.

FIG. 2 illustrates an alternative embodiment of the workstation 10 wherein the personal computer is replaced with a mobile access station having a mobile computing terminal 35, and remote access components such as a cellular telephone 40, a satellite connection 45, and a landline connection 50, as well as appropriate hardware for connecting to the above-noted remote access components and other input and output devices. Hardware for gaining remote access may include a modem or some other communication-type card that may be interfaced with the mobile computing terminal 35. Remote access components provide the system user a communication path between the mobile computing terminal 35 and a central INS station (not shown).

The mobile access station 30 shown in FIG. 2 includes a mobile computing terminal 35, a cellular telephone 40, a satellite connection 45, a land line connection 50, a color camera 55, and a fingerprint scanner 60. The mobile computing terminal 35 may be embodied in a portable notebook computer operating on the Windows 95® environment. The mobile computing terminal 35 gains access to the remote INS system via one of four paths including: the cellular telephone 40, the satellite connection 45, the land line connection 50, or the LAN/WAN connection 52. The use of a cellular telephone 40 to establish communication preferably comprises the use of a three Watt cellular phone known in the art as a "bag phone". The use of a bag telephone provides a better data path to the remote access server 65 than a low power "hand-held" cellular telephone. When the mobile computing terminal establishes communication to the INS location it is done so through an access server 62. The access server 62 performs the function of verifying the identity of the entity who is attempting to gain access to the INS system. In addition to the aforementioned communication devices, the mobile access station 30 includes a color camera 55 and a fingerprint scanner 60. The color camera 55 and a fingerprint scanner 60 are used to gather biometric data from the individual in question. The color camera 55 may be a digital camera or any other device suitable for obtaining digital images of apprehended individuals. The fingerprint scanner 60 is provided for obtaining digital images of the individual's fingerprints, digital fingerprint scanners are well known in the art. The color camera 55 and the fingerprint scanner 60 are interfaced to the mobile computing terminal 35 via a video capture card, which is known in the art.

In another embodiment, a two piece carrying case 65 (see FIG. 2) may be used to house the mobile computing terminal 35, the cellular telephone 40, the color camera 55, and the fingerprint scanner 60. The carrying case 65 provides component protection from shock and water damage. Additionally, the carrying case 65 eliminates the need for field personnel to connect the various components of the mobile access station 30 together each time the system is to be used. Rather the carrying case embodiment encases the connected hardware and creates one self-contained unit providing a power connection by which to power the unit. The power connection may be a 120 VAC connection. Alternatively, the power connection may be adapted to receive 12 VDC input from an automobile cigarette lighter.

Figure 3:
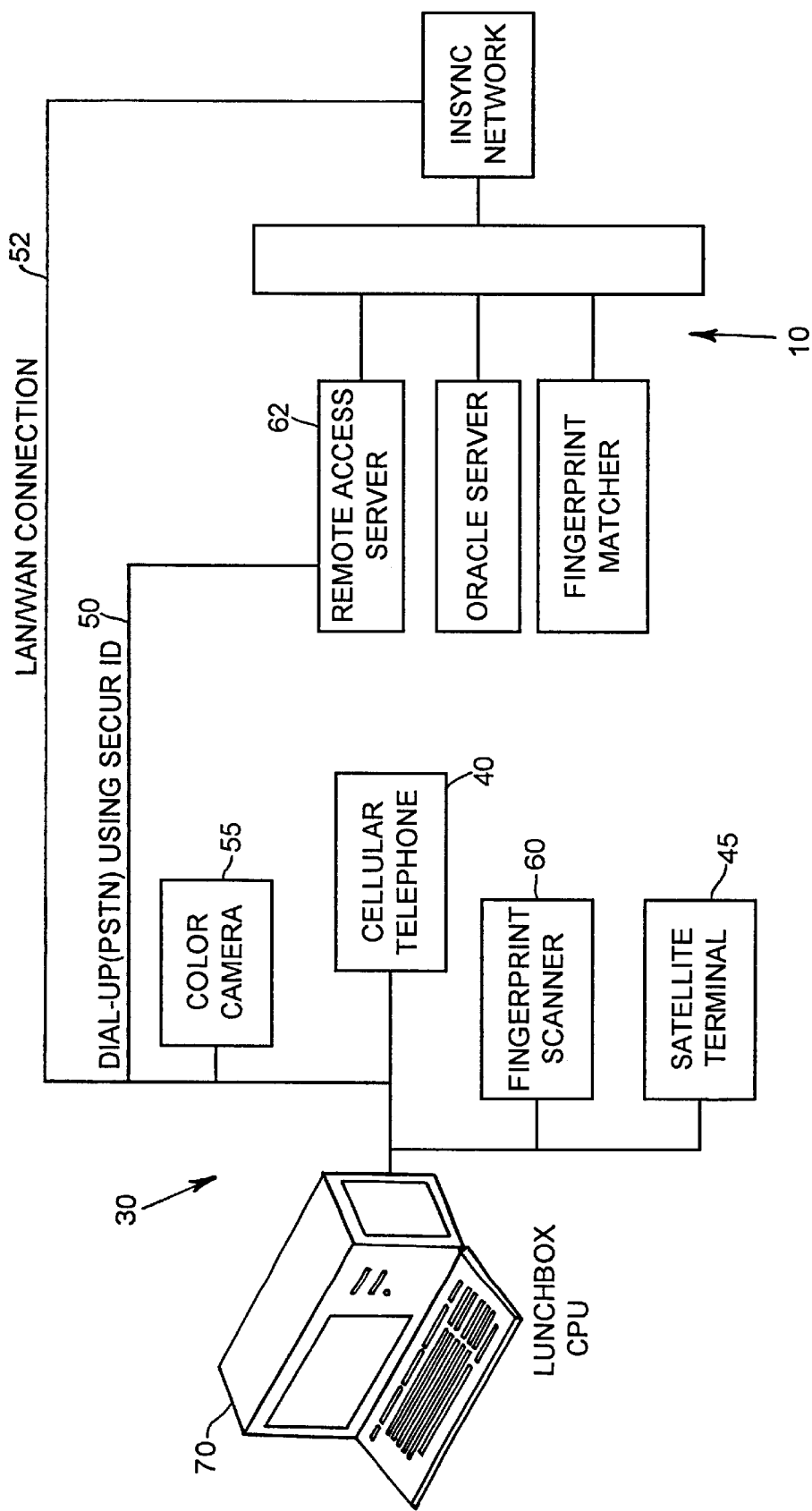
FIG. 3 is another alternative embodiment of the stand-alone workstation shown in FIGS. 1 and 2, wherein the workstation is housed in a lunchbox configuration.

FIG. 3 illustrates another embodiment of the workstation 10 of the present invention. This alternate embodiment varies from the previous embodiment in that the computing terminal 35 and its carrying case 65 housing are replaced by a "lunchbox" 70. The lunchbox 70 is a self contained processing unit and carrying case. The processing unit and operating system of the lunchbox 70 are identical to that of the mobile computing terminal 35. The lunchbox 70 is capable of accepting a number of different computer cards, which perform the function of interfacing to the cellular telephone 40, the color camera 55, the fingerprint scanner 60, the satellite connection 45, and the land line connection 50. Additionally, the lunchbox 70 configuration houses the cellular telephone 40, the color camera 55, and the fingerprint scanner 60 in a manner similar to the carrying case 65.

The lunchbox 70 configuration offers the advantages of being lightweight, small, low cost, self contained, and easy to maintain. Another distinct advantage is the addition of a bright screen that can be read in bright daylight, as opposed to a conventional laptop LCD screen that is difficult to read in bright sunshine. Similar to the carrying case 65 configuration, the only external component to the lunchbox 70 is a power cord. Power may be provided either using 120 VAC or 12 VDC.

Figure 4:
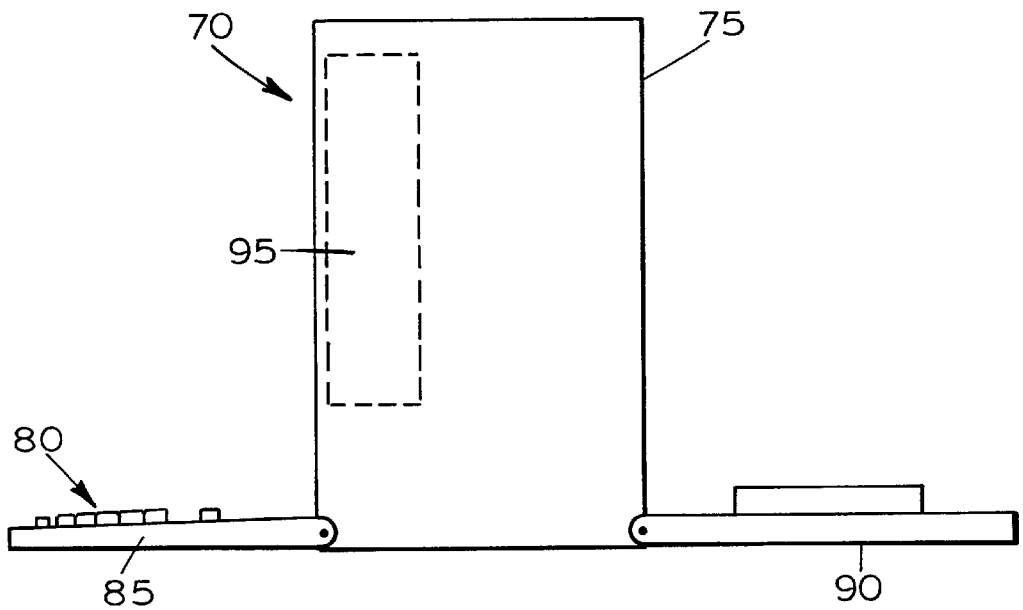
FIGS. 4 and 5 further illustrate the lunchbox configuration shown in FIG. 3.
Figure 5:
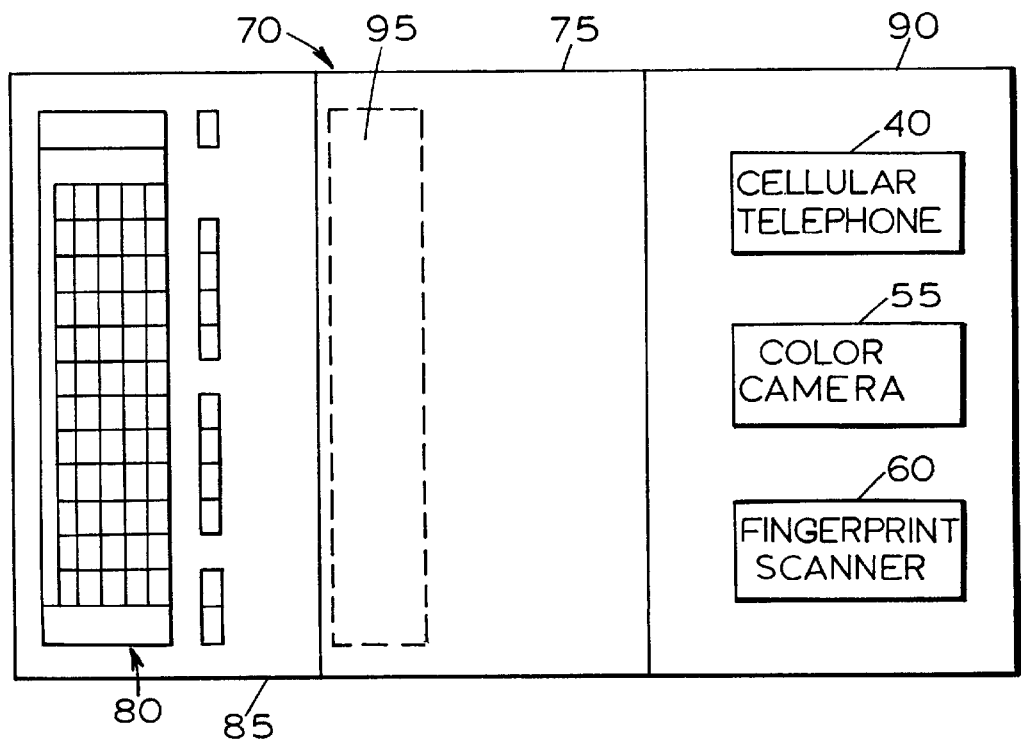

Side and plan views of the lunchbox 70 configuration can be seen in FIGS. 4 and 5. The lunchbox 70 configuration comprises a main housing 75, a keyboard 80, a foldable front panel 85, a foldable back panel 90, a display screen 95, and a processing unit (not shown) and associated interface cards (not shown) for accessing the cellular telephone 40, the color camera 55, and the fingerprint scanner 60.

The front panel 85 folds down from an upright and locked position that covers the display screen 95 to a downward position which reveals the keyboard 80. Likewise, the back panel 90 folds down to permit user access to the cellular telephone 40, the color camera 55, and the fingerprint scanner 60. A major advantage to this particular feature is the fact that when the both the front and back panels 85, 90 are closed and locked against the main housing 75 the keyboard 80, the display screen 95, and other associated components 40, 55, and 60 are protected from damage.

Figure 6:
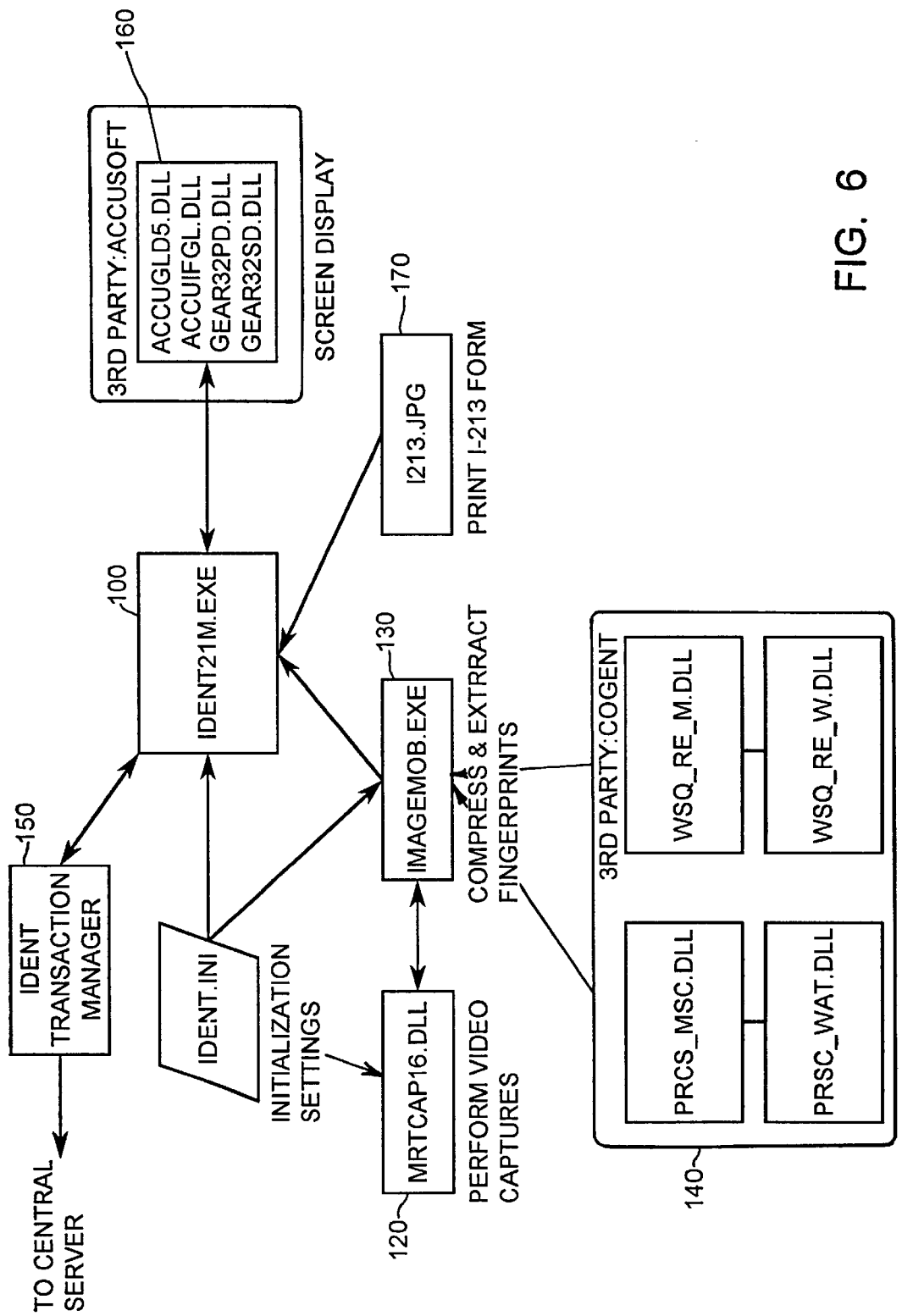
FIG. 6 is a diagram illustrating the software operations that perform the biometric identification functions of the workstations shown in FIGS. 1–5.

FIG. 6 illustrates the software operations performed by the stand-alone workstations shown in FIGS. 1–5. As shown in FIG. 6, the ident21m.exe file 100 is an executable file that is used on the mobile ident system. The ident21m.exe file 100 is the file that controls the functions of the mobile ident terminal. The ident.ini file 110 holds initialization information that is used to initialize the ident21 m.exe file 100, the mrtcap16.dll file 120, and imagemob.exe file 130. The ident.ini file 110 contains information pertaining to the hardware that is interfaced to the various software functions. For example, if a new fingerprint scanner is used, the ident.ini file 110 is the only file that must be changed to accommodate the hardware change.

The mrtcap16.dll file 120 performs the function of controlling video captures in the system. Specifically, the mrtcap16.dll file 120 controls the fingerprint scanner and the color camera. After digital images are captured by the mrtcap16.dll file 120, they are passed to the imagemob.exe file 130, which performs the function of compressing and extracting digital images. The imagemob.exe file 130 makes software calls to third party software referred to as Cogent 140. Cogent 140 performs the processing of the images received by the imagemod.exe file 130.

The ident21m.exe file 100 is interfaced to an ident transaction manager 150 which is located at the stand-alone workstation. The transaction manager 150 performs the function of receiving the image and biodata, as well as providing a software pathway from the ident21m.exe file 100 to the central server 10, which is located at a remote site. Additionally, the ident21m.exe file 100 controls the on-screen display. On-screen display (OSD) software 160, such as the on-screen display software available from Accusoft) is used to create various gray-scale on-screen displays. The OSD software 160 also provides various display utilities that aid in processing on-screen graphics. The i213.jpg file 170 is a graphics file that is printed when needed. Typically the i213.jpg file 170 is a form that is required when processing an apprehended individual.

When an individual is apprehended the system user selects an icon from the on-screen display, which preferably represents a Windows 95 environment. The icons represent the method of interface to the databases. The system user is then prompted to enter verification. Upon completion of verification the system user may elect to enroll the apprehended individual into the database located at the workstation. After selecting the enroll option, the ident.ini file 110 initializes all relevant files. As enrollment continues, the mrtcap16.dll file 120 performs the function of controlling the color camera and fingerprint scanner in a manner to obtain necessary information from the individual. The video images are compressed by known compression software 140 (e.g., available from "Cogent") under the control of the imagemob.exe file 130. The information is then transferred to the transaction manager 150 via the ident21m.exe file 100. The transaction manager 150 forwards the information to the databases. Queries as to the history of the apprehended individual are also forwarded to the databases in a similar fashion. Information regarding the history of the individual is returned to the ident21m.exe file 100 via the transaction manager 150. The received information is transferred to the screen display using OSD software 160.

Of course, it should be understood that a range of changes and modifications can be made to the preferred embodiment described above. For example, the present invention is described in connection with a particular hardware and processing structure for transmitting and receiving live biometric data. However, a wide variety of transmitting and receiving structures could be utilized as long as the essential stand-alone workstation features described herein are present. It is therefore intended that the foregoing detailed description be regarded as illustrative rather than limiting and that it be understood that it is the following claims, including all equivalents, which are intended to define the scope of this invention.

What is claimed is:

1. A distributed biometric identification system having a centralized server and one or more stand-alone workstations in communication with the centralized server, wherein one or more of said stand-alone workstations comprise:

a portable computer having a main body, a front panel hinged to said main body, and a back panel hinged to said main body;

said front panel having a stowed position adjacent said main body and a deployed position away from said main body;

said back panel having a stowed position adjacent said main body and a deployed position away from said main body;

a biometric data input system coupled to said portable computer and at least partially housed in said back panel;

a portable communications terminal coupled to said portable computer and at least partially housed in said back panel;

said computer including one or more databases for storing biometric data, the portable computer comprising a transaction management system, a matching controller subsystem coupled between the transaction management system and one or more of the databases, and an image storage and retrieval subsystem for storing and retrieving electronic images;

said biometric data input system receiving input biometric information for storing in one or more databases; and said computer programmed to:
      compare input biometric data to stored biometric data in the matching controller subsystem;
      transmit by means of the portable communications terminal biometric data to the centralized server and one or more stand-alone workstations for storage in the centralized server and/or the one or more stand-alone workstations;
      receive over the communications terminal biometric data from the centralized server or one or more other stand-alone workstations for storage in the one or more databases of said portable computer;
      display on a monitor of said portable computer user selectable functions;
      activate said biometric data input system to receive biometric data therefrom for storing in one or more databases;
      perform an analysis on the received biometric data to ensure the data meets a sufficient quality standard; and
      display on the monitor of said portable computer the number of hits, if any, resulting from comparison of the input biometric data to the biometric data stored in one or more of the databases.

2. The workstation of claim 1 wherein said computer generates stored biometric information in response to receiving input biometric data.

3. The workstation of claim 1 wherein said computer generates information indicating that no stored biometric information at a file server matches the input biometric data.

4. A distributed biometric identification system having a centralized server and one or more stand-alone workstations in communication with the centralized server, wherein one or more of said stand-alone workstations comprise:

a portable computer having a main body and a panel hinged to said main body;

said panel having a stowed position adjacent said main body and a deployed position away from said main body;

a biometric data input system coupled to said portable computer and at least partially housed therein;

a portable communications terminal coupled to said portable computer and at least partially housed therein;

said computer including one or more databases for storing biometric data, the portable computer comprising a transaction management system, a matching controller subsystem coupled between the transaction management system and one or more of the databases, and an image storage and retrieval subsystem for storing and retrieving electronic images;

said biometric data input system receiving input biometric information for storing in one or more databases; and said computer programmed to:

compare input biometric data to stored biometric data in the matching controller subsystem;

transmit by means of the portable communications terminal biometric data to the centralized server and one or more stand-alone workstations for storage in the centralized server and/or the one or more stand-alone workstations;

receive over the communications terminal biometric data from the centralized server or one or more other stand-alone workstations for storage in the one or more databases of said portable computer;

display on a monitor of said portable computer user selectable functions;

activate said biometric data input system to receive biometric data therefrom for storing in one or more databases;

perform an analysis on the received biometric data to ensure the data meets a sufficient quality standard; and display on the monitor of said portable computer the number of hits, if any, resulting from comparison of the input biometric data to the biometric data stored in one or more of the databases.

5. The workstation of claim 4 wherein said computer generates information indicating that no stored biometric information at a file server matches the input biometric data.

* * * * *

UNITED STATES PATENT AND TRADEMARK OFFICE
CERTIFICATE OF CORRECTION

PATENT NO. : 6,320,974 B1
DATED : November 20, 2001
INVENTOR(S) : Mary L. Glaze et al.

It is certified that error appears in the above-identified patent and that said Letters Patent is hereby corrected as shown below:

Title page,
Item [56], FOREIGN PATENT DOCUMENTS, delete "07050245" and insert
-- 0750245 --.
Item [56], OTHER PUBLICATIONS, delete "inentification", and insert
-- identification --; and after "fingerprint", delete "ientification", and insert
-- identification --.

Column 1,
Line 54, delete "08/987,956", and insert -- 08/937,956 --.

Column 2,
Line 36, after "each", delete "workstations", and insert -- workstation's --.

Column 8,
Line 20, after "and", delete ' "benefits" .'.", and insert -- "benefits." --.
Line 43, after "storage", delete "an", and insert -- and --.

Column 10,
Line 26, after "a", delete "self contained", and insert -- self-contained --.
Line 38, after "cost", delete "self contained", and insert -- self-contained --.
Line 60, after "when", delete "the".

Column 11,
Line 3, after "the", delete "ideni21 m.exe", and insert -- ident21m.exe --.
Line 19, after "the", delete " imagemod.exe", and insert -- imagemob.exe --.
Line 28, insert -- ( --.

UNITED STATES PATENT AND TRADEMARK OFFICE
CERTIFICATE OF CORRECTION

PATENT NO. : 6,320,974 B1
DATED : November 20, 2001
INVENTOR(S) : Mary L. Glaze et al.

It is certified that error appears in the above-identified patent and that said Letters Patent is hereby corrected as shown below:

Column 12,
Line 47, after "functions;", delete ";", and insert -- such as search and enroll, search only, and verify; --.

Signed and Sealed this

Ninth Day of July, 2002

Attest:

JAMES E. ROGAN
Attesting Officer  Director of the United States Patent and Trademark Office